(12) United States Patent
Clark

(10) Patent No.: US 9,194,961 B2
(45) Date of Patent: *Nov. 24, 2015

(54) METHOD FOR ASSESSING AN ALPHA PARTICLE EMISSION POTENTIAL OF A METALLIC MATERIAL

(71) Applicant: Honeywell International Inc., Morristown, NJ (US)

(72) Inventor: Brett M. Clark, Spokane Valley, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,062

(22) Filed: Feb. 24, 2015

(65) Prior Publication Data
US 2015/0177385 A1 Jun. 25, 2015

Related U.S. Application Data

(63) Continuation of application No. 13/800,115, filed on Mar. 13, 2013, now Pat. No. 8,993,978.

(60) Provisional application No. 61/714,059, filed on Oct. 15, 2012, provisional application No. 61/670,960, filed on Jul. 12, 2012, provisional application No. 61/661,863, filed on Jun. 20, 2012, provisional application No. 61/642,787, filed on May 4, 2012.

(51) Int. Cl.
*G01J 1/42* (2006.01)
*G01T 1/00* (2006.01)
*G01T 1/167* (2006.01)

(52) U.S. Cl.
CPC ........................ *G01T 1/167* (2013.01)

(58) Field of Classification Search
CPC .................................................. G01T 1/167
USPC ......................................................... 250/395
See application file for complete search history.

(56) References Cited

U.S. PATENT DOCUMENTS

| | | | |
|---|---|---|---|
| 4,584,161 | A | 4/1986 | Post et al. |
| RE33,313 | E | 8/1990 | Dunlop et al. |
| 6,346,469 | B1 | 2/2002 | Greer |
| 6,365,042 | B1 | 4/2002 | Sorensen et al. |
| 6,645,789 | B2 | 11/2003 | Bernstein et al. |
| 6,674,072 | B2 | 1/2004 | Lykken et al. |
| 7,318,840 | B2 | 1/2008 | McKay |
| 7,476,370 | B2 | 1/2009 | Mitsugashira et al. |
| 7,550,858 | B1 | 6/2009 | Drimer |
| 7,745,799 | B2 | 6/2010 | Smith |
| 7,973,287 | B2 | 7/2011 | Craig et al. |
| 8,129,267 | B2 | 3/2012 | Cabral et al. |
| 8,142,758 | B2 | 3/2012 | Larsen et al. |
| 8,277,774 | B2 | 10/2012 | Werner et al. |
| 2004/0061060 | A1 | 4/2004 | Layman et al. |
| 2009/0101830 | A1 | 4/2009 | Craig et al. |
| 2010/0038550 | A1 | 2/2010 | DeVito |
| 2013/0028786 | A1 | 1/2013 | Kanou |

FOREIGN PATENT DOCUMENTS

| | | | |
|---|---|---|---|
| JP | S5964791 | A | 4/1984 |
| JP | 62146289 | A | 6/1987 |

OTHER PUBLICATIONS

Baumann, Robert et al., Call for Improved Ultra-Low Backround Alpha Particle Emission Metrology for the Semiconductor Industry, May 15, 2001, International SEMATECH, Technology Transfer # 01054118A-XFR, 12 pages.
Bouldin, D.P., "The Measurement of Alpha Particle Emissions From Semiconductor Memory Materials", Journal of Electronic Materials, vol. 10, No. 4, 1981, 25 Pages.
Brodzinski, Ron et al., "A White Paper on Alpha Activity in Lead", 1998, 5 pages.
Clark, Brett Dr., A Study of Alpha Emitting Isotope Migration Within Lead-Free Materials, IEEE SER Workshop, Oct. 28, 2010, Honeywell Electronic Materials, 15 pages.
Gedion, Michael et al.. "Uranium and Thorium Contribution to Soft Error Rate in Advanced Technologies", IEEE Transactions on Nuclear Science, vol. 58, No. 3, Jun. 2011, pp. 1098-1103.
Gordon, S. et al., "Alpha-Particle Emission Energy Spectra from Materials Used for Solder Bumps", IEEE Transactions on Nuclear Science, vol. 57, Dec. 2010, pp. 3252-3256.
International Preliminary Report on Patentability issued in PCT/US2013/034000, completed Nov. 4, 2014 5 pages.
International Search Report and Written Opinion issued in PCT/US2013/034000, mailed Jun. 21, 2013, 7 pages.
Lantz, Leon II, "Tutorial: Soft Errors Induced by Alpha Particles" IEEE Transactions on Reliability, vol. 45, No. 2, 1996, 6 pages.
Lykken, G.I. et al., "Clean Galena, Contaminated Lead, and Soft Errors in Memory Chips", Journal of Electronic Materials, vol. 29, No. 10, 2000, 4 pages.
Martinie, S. et al., "Alpha-particle Induced Soft-Error Rate in CMOS 130 nm SRAM", IEEE Transactions on Nuclear Science, vol. 58, No. 3, Jun. 2011, pp. 1086-1092.

(Continued)

*Primary Examiner* — Marcus Taningco
*Assistant Examiner* — Abra Fein
(74) *Attorney, Agent, or Firm* — Faegre Baker Daniels LLP

(57) ABSTRACT

A method for assessing an alpha particle emission potential of a metallic material. A metallic material is initially subjected to a secular equilibrium disruption process, such as melting and/or refining, to disrupt the secular equilibrium of the radioactive decay of one or more target parent isotopes in the material. A sample of the material is treated to diffuse target decay isotopes within the sample such that the measured alpha particle emission directly corresponds to the concentration or number of target decay isotope atoms within the entirety of the sample, enabling the concentration of target decay isotopes in the sample to be determined. The concentration of target parent isotopes in the material may then be determined from the concentration of target decay isotopes and time elapsed from the secular equilibrium disruption process, and may be used to determine a maximum alpha particle emission that the metallic material will exhibit.

19 Claims, No Drawings

(56) References Cited

OTHER PUBLICATIONS

May, Timothy C. et al., "Alpha-Particle Induced Soft Errors in Dynamic Memories", IEEE, (C)1979, 7 pages.

Moriwaka, Yasushi et al., "Ultra Low Alpha Emission Lead Free Solder for Flip Chip Bumps", 2001 International Symposium on Microelectronics Baltimore, Proceedings of SPIE, The International Society of Optical Engineering, Oct. 9, 2001-Oct. 11, 2001 vol. 4587, pp. 559-564.

Secomb, R.J. et al., "The Removal of Polonium-210 and Lead-210 From Copper Process Streams by Molybdenum-doped sodium Tungstate", Acta, (2007), pp. 727-731.

Semiconductors, "Bad Connections, Deleading Solder Creates Worries About Electronics Reliability", Scientific American, Dec. 1999, 2 pages.

Young, Patrick, "Technologies of the Next Century", American Institute of Physics, Dec. 1999, 2 pages.

Zastawny, A. et al., "Migration of 210 Po in Lead to the Surface", Appl. Radiat. Isot., vol. 43, No. 9, 1992, pp. 1147-1150.

Zastawny, Andrzej et al., "Changes in the Surface Radioactivity of Lead—the Effect of teh Diffusion of Bismuth and Polonium Radiosotopes", Radiat. Isot., vol. 40, No. 1, 1989, pp. 19-25.

METHOD FOR ASSESSING AN ALPHA PARTICLE EMISSION POTENTIAL OF A METALLIC MATERIAL

CROSS-REFERENCE TO RELATED APPLICATION

This application is a continuation of U.S. patent application Ser. No. 13/800,115, filed Mar. 13, 2013, which claims priority to U.S. Provisional Application No. 61/714,059, filed Oct. 15, 2012, U.S. Provisional Application No. 61/670,960, filed Jul. 12, 2012, U.S. Provisional Application No. 61/661,863, filed Jun. 20, 2012, and U.S. Provisional Application No. 61/642,787, filed May 4, 2012, each of which are herein incorporated by reference in their entirety.

FIELD OF THE INVENTION

The present disclosure relates to metallic materials used in the manufacture of electronic components, and in particular, the present disclosure relates to a method for assessing an alpha particle emission potential of a metallic material of the type used in the manufacture of electronic components.

DESCRIPTION OF THE RELATED ART

Metallic materials, such as pure metals and metal alloys, for example, are typically used as solders in many electronic device packaging and other electronic manufacturing applications. It is well known that the emission of alpha particles from certain isotopes may lead to single-event upsets ("SEUs"), often referred to as soft errors or soft error upsets. Alpha particle emission (also referred to as alpha flux) can cause damage to packaged electronic devices, and more particularly, can cause soft error upsets and even electronic device failure in certain cases. Concerns regarding potential alpha particle emission heighten as electronic device sizes are reduced and alpha particle emitting metallic materials are located in closer proximity to potentially sensitive locations.

Initial research surrounding alpha particle emission from metallic materials focused on lead-based solders used in electronic device packaging, and consequent efforts to improve the purity of such lead-based solders. More recently, there has been a transition to the use of non-lead or "lead free" metallic materials, such as silver, tin, copper, bismuth, aluminum, and nickel, for example, either as alloys or as pure elemental materials. However, even in substantially pure non-lead metallic materials, lead is typically present as an impurity, and such materials are often refined to minimize the amount of lead impurities in the materials.

Uranium and thorium are well known as principal radioactive elements often present in metallic materials which may radioactively decay according to known decay chains to form alpha particle emitting isotopes. Of particular concern in non-lead materials is the presence of polonium-210 ($^{210}$Po) which is considered to be the primary alpha particle emitter responsible for soft error upsets. Lead-210($^{210}$Pb) is a decay daughter of uranium-238 ($^{238}$U), has a half-life of 22.3 years, and β-decays to bismuth-210 ($^{210}$Bi). However, due to the very short 5.01 day half-life of $^{210}$Bi, such isotope is essentially a transient intermediary which rapidly decays to $^{210}$Po. The $^{210}$Po has a 138.4 day half-life and decays to the stable lead-206 ($^{206}$Pb) by emission of a 5.304 MeV alpha particle. It is the latter step of the $^{210}$Pb decay chain, namely, the decay of $^{210}$Po to $^{206}$Pb with release of an alpha particle, that is of most concern in metallic materials used in electronic device applications.

Although $^{210}$Po and/or $^{210}$Pb may be at least in part removed by melting and/or refining techniques, such isotopes may remain as impurities in a metallic material even after melting or refining. Removal of $^{210}$Po from a metallic material results in a temporary decrease in alpha particle emissions from the metallic material. However, it has been observed that alpha particle emissions, though initially lowered, will typically increase over time to potentially unacceptable levels as the secular equilibrium of the $^{210}$Pb decay profile is gradually restored based on any $^{210}$Pb remaining in the metallic material.

Problematically, whether an increase in alpha emissions of a metallic material following a melting or refining process will eventually reach unacceptable levels is very difficult to assess and/or predict.

What is needed is a method of accurately assessing a level of alpha particle emissions that a given metallic material will experience.

SUMMARY OF THE INVENTION

The present disclosure provides a method for assessing an alpha particle emission potential of a metallic material. A metallic material is initially subjected to a secular equilibrium disruption process, such as melting and/or refining, to disrupt the secular equilibrium of one or more target parent isotopes in the material. A sample of the material is treated to diffuse target decay isotopes within the sample such that the measured alpha particle emission directly corresponds to the concentration or number of target decay isotope atoms within the entirety of the sample, enabling the concentration of target decay isotopes in the sample to be determined. The concentration of target parent isotopes in the material may then be determined from the concentration of target decay isotopes and time elapsed from the secular equilibrium disruption process, and may be used to determine a maximum alpha particle emission that the metallic material will exhibit.

In one form thereof, the present disclosure provides a method for assessing an alpha particle emission potential of a metallic material, the method including the steps of: detecting alpha particle emissions from a sample of the metallic material; determining a concentration of a target parent isotope in the sample of the metallic material from the alpha particle emissions detected in said detecting step and a time which has elapsed between said detecting step and a prior secular equilibrium disruption process; and determining a possible alpha emission of a target decay isotope of the target parent isotope from the determined concentration of the target parent isotope and the half-life of the target parent isotope.

In another form thereof, the present disclosure provides a method for assessing an alpha particle emission potential of a metallic material, the method including the steps of: subjecting a metallic material to a secular equilibrium disruption process; obtaining a sample of the metallic material following said subjecting step; detecting alpha particle emissions from the sample; determining a concentration of a target parent isotope in the sample from the alpha particle emissions detected in said detecting step and an elapsed time between said subjecting step and said detecting step; and determining a possible alpha emission of a target decay isotope of the target parent isotope from the determined concentration of the target parent isotope and the half-life of the target parent isotope.

DETAILED DESCRIPTION

The present disclosure provides a method for assessing an alpha particle emission potential of a metallic material of the type typically used in the manufacture of electronic components, such as metallic materials used for solders, for example. The metallic material may be itself a single or substantially pure elemental material, such as tin, lead, copper, aluminum, bismuth, silver, and nickel, for example, or may be an alloy of any two or more of the foregoing materials or an alloy of any one or more of the foregoing materials with one or more other elements.

The present method is principally described herein with reference to tin as the pure elemental material, and with reference to the $^{210}$Pb decay chain by which $^{210}$Po is the primary alpha particle emitter. However, the present method may also be used in connection with assessing alpha particle emissions in other pure elemental materials and in alloys, and may also be used to assess alpha particle emission from one or more isotopes other than $^{210}$Po formed from the $^{210}$Pb decay chain.

As used herein, the term "target parent isotope" refers to an isotope of interest which is present in a metallic material and is able to decay to a daughter isotope, wherein the daughter isotope may subsequently alpha-decay, i.e., may decay to a further isotope with concomitant emission of an alpha particle. The term "target decay isotope", as used herein, refers to an isotope of interest which is a daughter isotope of the target parent isotope and itself may subsequently alpha-decay, i.e., may decay to a further isotope with concomitant emission of an alpha particle. The target decay isotope may or may not be itself a direct decay product of the target parent isotope. For example, if $^{210}$Pb is a target parent isotope, $^{210}$Po may be a target decay isotope even though $^{210}$Pb decays to $^{210}$Bi with subsequent decay of $^{210}$Bi to $^{210}$Po.

Although lead may be removed from a non-lead elemental material such as tin, copper, aluminum, bismuth, silver, and nickel, for example, by refining in order to reduce the amount of $^{210}$Pb in the material and thereby the eventual alpha particle emissions, the amount of lead present in the material may still be potentially problematic in the context of alpha particle emissions even when the amount of lead is well beneath the detection limit of existing analytical methods for detecting individual elements. For example, lead present as an impurity in metallic materials may pose concern in the context of alpha particle emissions even at levels lower than parts per trillion by mass, which is below the detection limit of any existing analytical chemistry method. Therefore, even strenuous refining may not effectively remove $^{210}$Pb to acceptable levels and, even where refining is known to be effective, existing analytical methods will typically be inadequate to detect any $^{210}$Pb remaining in a given metallic material following refining. Advantageously, the present method allows an amount, which as desired may be a maximum amount, of alpha particle emissions to be calculated for a given metallic material even when the amount of lead and/or other radioactive impurities in the material are themselves present at levels or concentrations well below the detection limit of any existing analytical method.

According to the present method, the metallic material is subjected to a secular equilibrium disruption process. As used herein, the term "secular equilibrium disruption process" refers to a process to which the metallic material is subjected which at least partially disrupts the secular equilibrium of the decay profile of at least one target parent isotope within the metallic material. In most instances, the secular equilibrium disruption process disrupts the secular equilibrium of the decay profile of a target parent isotope by reducing the concentration of the target parent isotope in the metallic material, by reducing the concentration of a corresponding target decay isotope in the metallic material, or by a combination of the foregoing. Exemplary secular equilibrium disruption processes include melting, casting, smelting, refining, or any combination of two or more of the foregoing processes. Exemplary refining processes include electro- or electrochemical refining, chemical refining, zone refining, and vacuum distillation. Typically, in the secular equilibrium disruption process, and particularly when the secular equilibrium disruption process is at least in part a refining process, both the target parent isotopes and the target decay isotopes are at least partially removed as impurities or contaminant components by physical and/or chemical separation from the bulk metallic material.

In some embodiments, the secular equilibrium disruption process may remove substantially all of a given target decay isotope and thereby effectively "reset" the secular equilibrium of the corresponding target parent isotope. For example, in the case of a metallic material including $^{210}$Pb as a target parent isotope, the secular equilibrium disruption process may substantially completely remove all of the $^{210}$Po target decay isotope in the material, such that the secular equilibrium of $^{210}$Pb is effectively reset, wherein substantially all $^{210}$Po that is present in the material following the secular equilibrium disruption process is generated by decay of $^{210}$Pb after the said disruption process. However, the present process may also be practiced using secular equilibrium disruption processes that remove only a portion of the target parent isotope and/or target decay isotope, and the present process is not limited to secular equilibrium disruption processes that remove substantially all of a given target decay isotope.

In some embodiments, the secular equilibrium disruption process may be completed in a relatively short amount of time and, in other embodiments, the secular equilibrium disruption processes may require a relatively greater amount of time for completion, depending on the nature of the process and the number of processes that together may constitute the secular equilibrium disruption process. Therefore, the elapsed time discussed below, between the secular equilibrium disruption process and the measurement of alpha particle emissions of the metallic material, may be an elapsed time between the completion of the secular equilibrium disruption process (or processes) and the measurement of alpha particle emissions of the metallic material.

After the metallic material is subjected to the secular equilibrium disruption process, the alpha particle emission of the metallic material is detected, i.e., an alpha particle emission measurement is obtained. Although it is within the scope of the present disclosure to obtain an alpha particle emission of the entire metallic material in bulk form, typically a sample of the bulk metallic material will be obtained for purposes of alpha particle emission analysis.

A relatively thin portion of the bulk metallic material may be obtained as a sample by a suitable method such as rolling the bulk metallic material to provide a thin sheet of sample material, or by any other another suitable method.

After the sample is obtained, the sample is treated by heat in order to promote diffusion of target decay isotopes in the sample material until such point that the concentration of atoms of the target decay isotopes in the sample is uniform throughout the sample volume. In many samples, there may be a larger concentration of atoms of target decay isotopes toward the center of the sample, for example, or otherwise in other areas of the sample such that a concentration mismatch or gradient is present. The heat treatment removes any such concentration mismatches or gradients by promoting diffusion of atoms of target decay isotopes within the sample from areas of relatively higher concentration toward areas of relatively lower concentration such that a uniform concentration of target decay isotopes is obtained within and throughout the sample. When such uniform concentration is obtained, the number of atoms of target decay isotopes within a detection limit depth of the alpha particle detection process will be representative of and, more particularly, will correlate directly to, the uniform concentration of atoms of target decay isotopes throughout the entirety of the sample. Such uniform concentration is achieved when the chemical potential gradient of the target decay isotopes is substantially zero and the concentration of the target decay isotopes is substantially uniform throughout the sample.

Stated in another way, at room temperature, the test sample may have a chemical potential gradient, in that the concentration of target decay isotopes is higher on one side of the sample than another side of the sample, or at the centroid of the sample than at the outer surfaces of the sample. Heating of the sample adjusts the chemical potential gradient and, at a sufficient time and temperature exposure, the chemical potential gradient is substantially zero and the concentration of the target decay isotopes is substantially uniform throughout the sample.

As used herein, the term "detection limit depth" refers to a distance within a given metallic material through which an emitted alpha particle may penetrate in order to reach a surface of the material and thereby be released from the material for analytical detection. Detection limit depths for $^{210}$Po in selected metallic materials are provided in Table 1 below, in microns, which is based on the penetration of the 5.304 MeV alpha particle released upon decay of $^{210}$Po to $^{206}$Pb:

TABLE 1

Detection limit depths of $^{210}$Po in selected metallic materials

| Metallic material | Detection limit depth of $^{210}$Po (microns) |
|---|---|
| Tin (Sn) | 16.5 |
| Aluminum (Al) | 23.3 |
| Copper (Cu) | 11 |
| Bismuth (Bi) | 17.1 |

The detection limit depth for alpha particles of differing energy, such as alpha particles emitted upon radioactive decay of alpha particle-emitting isotopes other than $^{210}$Po, will vary, with the detection limit depth generally proportional to the energy of the alpha particle. In the present method, emitted alpha particles may be detected by use of a gas flow counter such as an XIA 1800-UltraLo gas ionization chamber available from XIA L.L.C. of Hayward, Calif. according the method described by JEDEC standard JESD 221.

Target decay isotopes such as $^{210}$Po are known to diffuse or migrate within metallic materials and, in this respect, the heat treatment of the present method is used to promote diffusion of the target decay isotope within the material sample to eliminate concentration gradients. In particular, target decay isotopes, such as $^{210}$Po, will have a diffusion rate J in a given metallic material, which can be expressed according to equation (1) below:

$$J = -D \frac{\partial \phi_{Po}}{\partial x} \qquad (1)$$

wherein:

$\partial \phi / \partial x$ is the concentration gradient of the target decay isotope, such as $^{210}$Po, and D is the diffusion coefficient. The concentration gradient of the target decay isotope is determined by measuring the alpha particle emissions at the surface of a sample, removing a layer of material of x thickness, such as by chemical etching, and measuring the alpha particle emissions at the x depth. The concentration of the target decay isotope at the original surface and at depth x is directly proportional to the alpha particle emission at each surface, and concentration gradient of the target decay isotope is calculated as the difference between the concentration at one of the surfaces and the concentration at depth x over the distance x.

To determine the polonium diffusion rate J, the polonium alpha particle emissions from 5-5.5 MeV in a tin sample was measured. The sample was then heated at 200° C. for 6 hours, and the alpha particle emission measurement was repeated. The number of polonium atoms N is calculated from equation (2) below:

$$N = A/\lambda_{Po} \qquad (2)$$

wherein:

A is the alpha particle emission measured in counts/hr; and
$\lambda_{Po}$=ln 2/1138.4 days, based on the half-life of $^{210}$Po.

The number of moles of polonium was calculated by dividing the number of polonium atoms N by Avogadro's number. Dividing the difference in the number of moles of polonium by the sample area (0.1800 m$^2$) and the time over which the sample was heated (6 hours) yields a lower bound on the diffusion rate of 4.5×10$^{-23}$ mol·m$^{-2}$·s$^{-1}$ at 473K in tin.

TABLE 2

Data for diffusion rate determination

| Measurement | A (Counts/Hr) | N (atoms) | Moles |
|---|---|---|---|
| Initial | 24.75 | 1.19E+05 | 1.97E−19 |
| Final | 46.71 | 2.24E+05 | 3.72E−19 |

Based on equation (1), one may determine a suitable time and temperature heating profile to which the sample may be exposed in order to diffuse the target decay isotope within the sample sufficiently to eliminate any concentration gradients, such that detection of alpha particle emissions within the detection limit depth of the sample is representative, and directly correlates, to the concentration of the target decay isotope throughout the sample. For example, for a tin sample having a thickness of 1 millimeter, a heat treatment of 200° C. for 6 hours will ensure that any concentration gradients of $^{210}$Po atoms within the sample are eliminated.

Thus, for a given metallic material and sample size, the application of heat may be selected and controlled by time and temperature exposure of the sample to ensure that atoms of a target decay isotope are diffused to a sufficient extent to eliminate concentration gradients. It has been found that, by the present method, in providing a suitable time and temperature profile for the heat treatment step, measurement of alpha particle emissions from a target decay isotope present within the detection limit depth directly corresponds to the concentration or number of target decay isotope atoms within the entirety of the sample.

It is generally known that subjecting a metallic material to heat promotes diffusion of elements within the material. However, prior methods have employed heat treatment simply to increase the number of alpha particle emissions detected over background levels to thereby increase the signal to noise ratio of the alpha particle emission detection.

The alpha particle emissions attributable to $^{210}$Po is expressed as polonium alpha activity, $A_{Po}$, at a time (t) following the secular equilibrium disruption process. From the $A_{Po}$ and elapsed time (t), the concentration of $^{210}$Pb atoms in the sample can be calculated using equation (3):

$$[^{210}Pb]_0 = \frac{\lambda_{Po} - \lambda_{Pb}}{\lambda_{Po}\lambda_{Pb}(e^{-\lambda_{Pb}t} - e^{-\lambda_{Po}t})}(A_{Po}(t) + A_{Po}(t_0)e^{-\lambda_{Po}t}) \quad (3)$$

wherein:
$\lambda_{Po}$=ln2/138.4 days, based on the half-life of $^{210}$Po;
$\lambda_{Pb}$=ln2/22.3 years (8,145.25 days) based on the half-life of $^{210}$Pb; and
time (t) is the time which has elapsed between the secular equilibrium disruption process and the alpha particle emission measurement.

Due to the fact that $^{210}$Pb has a 22.3 year half-life, the $^{210}$Pb concentration is substantially constant over the time (t) when the time (t) is less than three years, particularly where the alpha particle emission measurement occurs relatively soon after the secular equilibrium disruption process. Also, when substantially all of the $^{210}$Po is removed in the secular equilibrium disruption process (which may be the case when the secular equilibrium disruption process is a strenuous refining process, for example) the last term in equation (3) above is very near to zero because the initial $^{210}$Po concentration will be very near to zero when the alpha particle emissions are measured relatively soon after the secular equilibrium disruption.

The concentration of the target parent isotope may be calculated by the above-equation (3) and, once the concentration of the target parent isotope is calculated, the known half-life of the target parent isotope may be used to provide an assessment or prediction of a maximum concentration of the target decay isotope within the material based on the re-establishment of the secular equilibrium profile of the target parent isotope.

In other words, once the concentration of $^{210}$Pb atoms is determined using equation (3), based on the half-life of $^{210}$Pb the maximum $^{210}$Po activity at re-establishment of secular equilibrium will occur at (t)=828 days, and is calculated from equation (4) below:

$$A_{Po}(t = 828 \text{ d}) = \frac{\lambda_{Pb}\lambda_{Po}}{\lambda_{Po} - \lambda_{Pb}}[^{210}Pb]_0 (e^{-\lambda_{Pb}828 \text{ d}} - e^{-\lambda_{Po}828 \text{ d}}) \quad (4)$$

Consistent time units (i.e., days or years) should be used across equation (3) and equation (4).

The maximum $^{210}$Po activity directly correlates to a maximum alpha particle emission of the material, and will occur at 828 days from the secular equilibrium disruption process. In this manner, due to the fact that the present method will typically be carried out relatively soon after the secular equilibrium disruption process, the calculated maximum concentration of the target decay isotope and concomitant alpha particle emission will typically be a maximum future concentration of the target decay isotope and concomitant alpha particle emission that the metallic material will exhibit over a timeframe which corresponds to the half-life of the target parent isotope.

For example, based on the half-life of $^{210}$Pb, the applicable timeframe or "window" by which a maximum possible concentration of $^{210}$Po (and thereby a peak in alpha particle emissions) will be reached in the material will occur at 828 days (27 months) from the secular equilibrium disruption process.

It is also possible to calculate a possible concentration of $^{210}$Po (and thereby the alpha particle emissions) at any specified elapsed time from the secular equilibrium disruption process. In this manner, it is possible to calculate a possible concentration of $^{210}$Po after a sufficient elapsed time from the secular equilibrium disruption process, where the sufficient elapsed time may be at least 200, 250, 300, 350 or 365 days from the secular equilibrium disruption process. For example, based on the half-life of $^{210}$Pb, the applicable timeframe by which the $^{210}$Po concentration will reach 67% of the maximum possible concentration in the material will occur at 200 days from the secular equilibrium disruption process. Similarly, the $^{210}$Po concentration will reach 80% and 88% of the maximum possible concentration in the material at 300 days and 365 days, respectively, from the secular equilibrium disruption process.

Advantageously, according to the present method, after a metallic material has been subjected to a secular equilibrium disruption process such as by refining the metallic material, a maximum alpha particle emission that the metallic material will reach during the useful life of the material may be accurately predicted. In this manner, the present method provides a valuable prediction of the maximum alpha particle emission for metallic materials, such as solders, that are incorporated into electronic devices.

EXAMPLES

The following non-limiting Examples illustrate various features and characteristics of the present invention, which is not to be construed as limited thereto.

Example 1

Determination of Maximum Alpha Emissions in Refined Tin Samples

The present method was used to assess the maximum potential alpha emissions in eight refined tin samples. The tin samples were refined according to the method disclosed in U.S. Provisional Patent Application Ser. No. 61/661,863, entitled Improved Refining Process for Producing Low Alpha Tin, filed on Jun. 20, 2012. Test samples of the refined tin samples were obtained by cutting an approximately 1 kilogram sample from an ingot and rolling the sample to a thickness of 1 millimeter. The test samples were heated at 200 C for six hours, and the alpha particle emissions of the test samples were measured using an XIA 1800-UltraLo gas ionization chamber available from XIA L.L.C. of Hayward, Calif. The measured alpha particle emissions and elapsed times between refining and the measurement of alpha particle emissions are shown below in Table 3.

TABLE 3

Refined tin sample data

| Sample | Alpha particle emissions (alpha flux) (counts/hr/cm$^2$) | Elapsed time (t) between refining and measurement of alpha particle emissions (days) | $^{210}$Pb concentration at time = 0 (atoms/cm$^2$) (equation (2)) | Maximum alpha particle emission (equation (3)) |
|---|---|---|---|---|
| 1 | 0.002 | 89 | 66 | 0.0056 |
| 2 | 0.0045 | 258 | 74 | 0.0063 |
| 3 | 0.0016 | 113 | 44 | 0.0037 |
| 4 | 0.004 | 272 | 64 | 0.0055 |

TABLE 3-continued

Refined tin sample data

| Sample | Alpha particle emissions (alpha flux) (counts/hr/cm$^2$) | Elapsed time (t) between refining and measurement of alpha particle emissions (days) | $^{210}$Pb concentration at time = 0 (atoms/cm$^2$) (equation (2)) | Maximum alpha particle emission (equation (3)) |
|---|---|---|---|---|
| 5 | 0.0016 | 211 | 29 | 0.0025 |
| 6 | 0.0009 | 32 | 72 | 0.0061 |
| 7 | 0.025 | 553 | 324 | 0.0276 |
| 8 | 0.0195 | 523 | 255 | 0.0217 |

From the measured alpha particle emission and the elapsed time (t) between refining and the measurement of alpha particle emission, the concentration of $^{210}$Pb at (t)=0 can be calculated from equation (3) above.

For example, the alpha particle emission of Sample 1 was measured at 0.002 counts/hr/cm$^2$ at 89 days from refining. Based on equation (3) above, the number of $^{210}$Pb atoms per cm2 ([$^{210}$Pb]$_0$) needed to generate the measured $^{210}$Po activity, i.e., measured alpha particle emission, was calculated to be 66. Using equation (4) above, the activity or predicted alpha particle emission of $^{210}$Po at (t)=828 days was calculated as 0.0056 counts/hr/cm$^2$.

In Sample 7, the alpha particle emission was measured at 0.025 counts/hr/cm$^2$ at 523 days from refining. The value of [$^{210}$Pb]$_0$ was calculated based on equation (3) to be 255 atoms/cm$^2$, and the maximum alpha particle emission was calculated based on equation (4) as 0.0217 counts/hr/cm$^2$.

As may be seen from Samples 1 and 7, the difference between the measured alpha particle emission and the calculated maximum alpha particle emission decreases as time (t) approaches 828 days, with the greater difference for Sample 1 attributable to the alpha particle emission measurement being obtained early in the secular equilibrium cycle before secular equilibrium could be re-established after refining.

Example 2

Determination of Time Required to Diffuse the Target Decay Isotope

The time required to diffuse the target decay isotope in a tin sample was investigated. Tin samples were refined according to the method disclosed in U.S. Provisional Patent Application Ser. No. 61/661,863, entitled Improved Refining Process for Producing Low Alpha Tin, filed on Jun. 20, 2012. A test sample of the refined tin sample was obtained by cutting a sample from an ingot and rolling the sample to a thickness of 0.45 millimeter. The test sample was heated at 200° C. for one hour, and the alpha particle emissions of the test samples were measured using an XIA 1800-UltraLo gas ionization chamber available from XIA L.L.C. of Hayward, Calif. Measurement of the alpha particle emissions required about 24 hours, after which the sample was again heated for one hour at 200° C. and the alpha particle emissions were measured. This process (e.g., one hour heat treatment followed by measurement of alpha particle emissions) was repeated for a total of five heat/measurement cycles. The measured alpha particle emissions and the total hours at which the sample was heated at 200° C. are shown below in Table 4.

TABLE 4

Determination of the target decay isotope diffusion data

| Total hour(s) sample heated | Alpha particle emissions (alpha flux) (counts/hr/cm$^2$) |
|---|---|
| 0 | 0.017 |
| 1 | 0.025 |
| 2 | 0.024 |
| 3 | 0.027 |
| 4 | 0.025 |
| 5 | 0.026 |

As can be seen from Table 4, the activity or alpha flux of the sample increased from 0.017 counts/hr/cm$^2$ to 0.025 counts/hr/cm$^2$ after one hour at 200° C. That is, the activity or alpha flux of the tin sample increased more than 50% after one hour at 200° C. As further shown in Table 4, there was no significant change in the activity or alpha flux of the sample when heated for more than one hour at 200° C., suggesting that one hour at 200° C. was sufficient to achieve a substantially uniform concentration of the target decay isotopes throughout the sample.

Example 3

Determination of Diffusion of Target Decay Isotopes in Copper Samples

The present method was used to assess the maximum potential alpha emissions in a copper sample. The copper sample was electrolytically refined from 99.99% to 99.9999% purity. After refinement, the purified copper was heated and molded into an ingot.

A test sample of a copper material was obtained by cutting a sample from the ingot and rolling the sample to a thickness of 3.2 mm. The alpha particle emissions of the test sample were measured using an XIA 1800-UltraLo gas ionization chamber available from XIA L.L.C. of Hayward, Calif., before and after heating the copper test sample for six hours at 200° C.

Prior to heating, the copper test sample had an activity or alpha flux of 0.0036 counts/hr/cm$^2$, and after heating at 200° C. for six hours, the copper test sample had an activity of 0.0051 counts/hr/cm$^2$. This example illustrates that heating promotes the diffusion of target decay isotopes in the copper material. The maximum alpha particle emissions for the copper sample calculated from Equation 4 above was 0.05 counts/hr/cm$^2$.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for assessing an alpha particle emission potential of a bulk material, said method comprising the steps of:
   detecting alpha particle emissions from a sample of the bulk material;
   determining a concentration of $^{210}$Pb in the sample from the alpha particle emissions detected in said detecting step and a time which has elapsed between said detecting step and a prior secular disruption process; and determining a possible alpha emission of $^{210}$Po from the determined concentration of $^{210}$Pb and a half-life of $^{210}$Pb.

2. The method of claim 1, wherein the time which has elapsed is an elapsed time between said detecting step and a completion of a prior secular equilibrium disruption process.

3. The method of claim 1, further comprising the additional steps, prior to said detecting step, of:
   obtaining a sample of the bulk material; and
   heating the sample to diffuse atoms of $^{210}$Po within the sample until a uniform concentration of $^{210}$Po is obtained throughout the sample.

4. The method of claim 1, wherein the secular equilibrium disruption process comprises at least one process selected from the group consisting of melting, refining, and combinations of the foregoing.

5. The method of claim 1, wherein said step of determining a possible alpha emission of $^{210}$Po comprises determining a maximum possible alpha emission of $^{210}$Po.

6. A method for assessing an alpha particle emission potential of a bulk material, said method comprising the steps of:
   detecting alpha particle emissions from a sample of the bulk material;
   adjusting the chemical potential gradient of the sample;
   determining a concentration of a target parent isotope in the sample from the alpha particle emissions detected in said detecting step and a time which has elapsed between said detecting step and a prior secular equilibrium disruption process; and
   determining a possible alpha emission of a target decay isotope of the target parent isotope from the determined concentration of the target parent isotope and the half-life of the target parent isotope.

7. The method of claim 6, wherein the target parent isotope is $^{210}$Pb.

8. The method of claim 6, wherein the target parent isotope is $^{210}$Pb and the target decay isotope is $^{210}$Po.

9. The method of claim 6, wherein said step of determining a possible alpha emission of a target decay isotope comprises determining a maximum possible alpha emission of the target decay isotope.

10. The method of claim 6, wherein said step of determining a possible alpha emission of a target decay isotope comprises determining a possible alpha emission of the target decay isotope at at least 300 days from completion of the secular equilibrium disruption process.

11. The method of claim 6, wherein the secular equilibrium disruption process removes substantially all the target decay isotope in the sample.

12. The method of claim 6, wherein said adjusting step comprises heating the sample to diffuse atoms of the target decay isotope within the sample until the chemical potential gradient of the sample is substantially zero.

13. The method of claim 6, wherein the secular equilibrium disruption process comprises at least one process selected from the group consisting of melting, refining, and combinations of the foregoing.

14. A method for assessing an alpha particle emission potential of a bulk material, said method comprising the steps of:
   subjecting the bulk material to a secular equilibrium disruption process by melting; obtaining a sample of the bulk material following said subjecting step;
   forming a uniform concentration of atoms of a target decay isotope throughout the sample;
   detecting alpha particle emissions from the sample;
   determining a concentration of a target parent isotope in the sample from the alpha particle emissions detected in said detecting step and an elapsed time between said subjecting step and said detecting step; and
   determining a possible alpha emission of the target decay isotope of the target parent isotope from the determined concentration of the target parent isotope and the half-life of the target parent isotope.

15. The method of claim 14, wherein the elapsed time between said subjecting step and said detecting step is an elapsed time between completion of said subjecting step and said detecting step.

16. The method of claim 14, wherein said forming step comprises heating the sample to diffuse atoms of the target decay isotope within the sample until a uniform concentration of atoms of the target decay isotope is obtained throughout the sample.

17. The method of claim 14, wherein the target parent isotope is $^{210}$Pb and the target decay isotope is $^{210}$Po.

18. The method of claim 14, wherein said step of determining a possible alpha emission of a target decay isotope comprises determining a maximum possible alpha emission of the target decay isotope.

19. The method of claim 14, wherein said step of determining a possible alpha emission of a target decay isotope comprises determining a possible alpha emission of the target decay isotope at at least 300 days from completion of the secular equilibrium disruption process.

* * * * *